Jan. 3, 1928.

R. ALFISI 1,655,350

LOCK FOR PREVENTING THEFT OF AUTOMOBILES

Filed March 27, 1925

WITNESSES

INVENTOR
RAFFAELE ALFISI
BY
ATTORNEYS

Jan. 3, 1928.
R. ALFISI
1,655,350
LOCK FOR PREVENTING THEFT OF AUTOMOBILES
Filed March 27, 1925
2 Sheets-Sheet 2
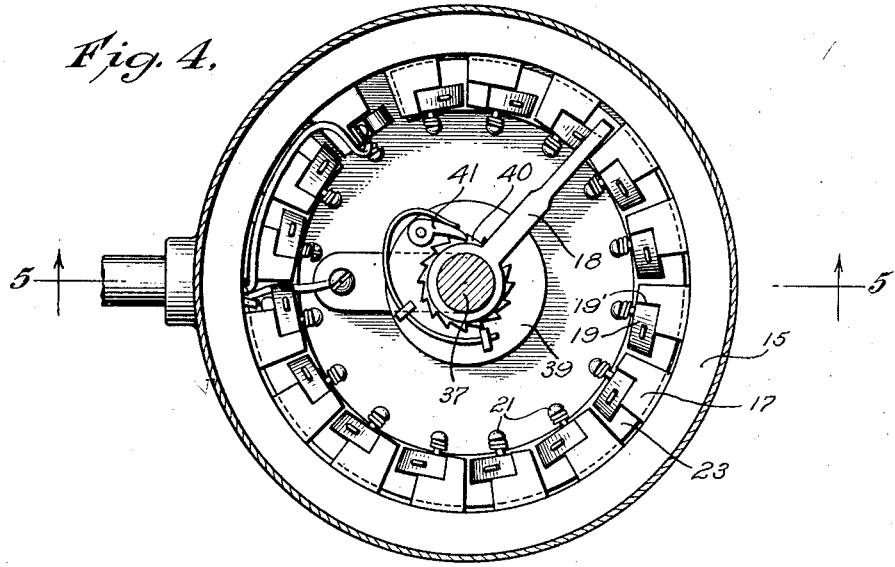
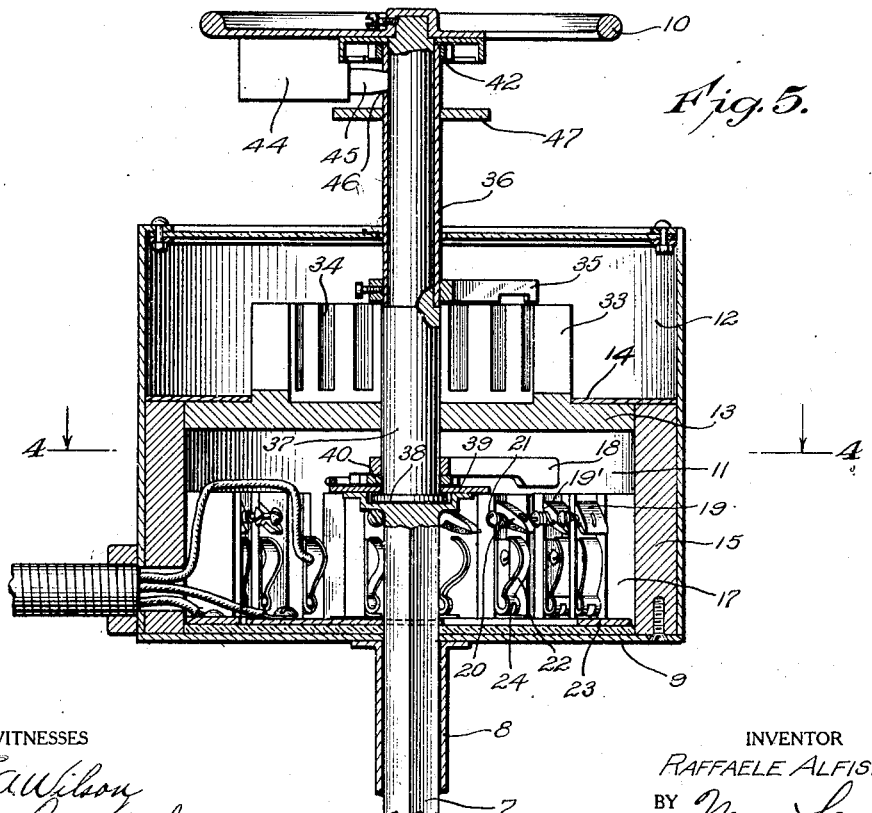
WITNESSES
INVENTOR
RAFFAELE ALFISI
BY
ATTORNEYS Patented Jan. 3, 1928.

1,655,350

UNITED STATES PATENT OFFICE.

RAFFAELE ALFISI, OF BROOKLYN, NEW YORK.

LOCK FOR PREVENTING THEFT OF AUTOMOBILES.

Application filed March 27, 1925. Serial No. 18,890.

This invention relates to locks for automobiles and particularly to an improved construction for preventing the theft of automobiles and has for an object to provide an improved construction wherein the steering apparatus of the automobile will be locked against movement and at the same time a signal set which will be operated when the lock is moved incorrectly.

Another object of the invention is to provide a lock for preventing the theft of automobiles wherein a signal is sounded when the lock is operated in an incorrect manner, the structure being such that the alarm can not be stopped by the thief after he has once operated the lock.

In the accompanying drawings—

Figure 4 is a sectional view through Figures 1 and 5 on line 4—4 of each figure.

Figure 5 is a sectional view through Figure 4 on line 5—5.

Figure 1:
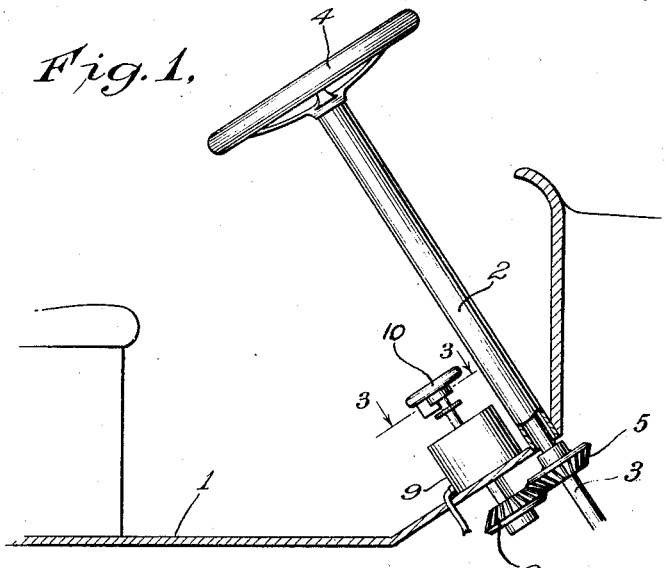
Figure 1 is a fragmentary sectional view through an automobile with a lock embodying the invention shown applied thereto and in locked position.

Referring to the accompanying drawing by numerals, 1 indicates an automobile of any desired kind which is provided with the usual steering post 2 with a steering rod 3 extending therethrough and connected in any desired manner with the steering wheel 4. The structure just described is old and well known and, therefore, further detail description will not be necessary. A pinion 5 is rigidly secured to the steering rod 3 and positioned to mesh with the gear 6 whenever the parts are in their locked position as shown in Figure 1. The gear 6 is rigidly secured to a shaft 7 (Figure 5) which shaft slidingly fits into the square guide 8 rigidly secured to the casing 9, which casing is connected in any suitable manner to the instrument board or floor of the automobile 1. The parts must be mounted in such a manner that the shaft 7 is parallel to the rod 3 in order that the gear 6 may be moved into and out of mesh with the gear wheel 5. By reason of the fact that the casing 9 is rigidly secured to the automobile and that the shaft 7 and guide 8 are square, the rod 3 is locked against rotation when the two gear wheels 5 and 6 are in mesh.

When it is desired to use the automobile, the hand wheel 10 is pressed downwardly and such movement will cause the shaft 7 to be moved downwardly as well as gear wheel 6, said movement continuing until gear wheel 6 is out of mesh with gear wheel 5. The automobile may then be steered readily. If the parts are set in the correct position, the downward movement of the hand wheel 10 and associated parts will merely cause the gear wheel 6 to move away from the gear wheel 5. However, if the parts are not correctly set and this movement takes place, an alarm will be sounded as hereinafter fully described, which alarm will continue to operate until the lock has been taken to pieces or the sounding device stopped through some other means.

Figure 2:
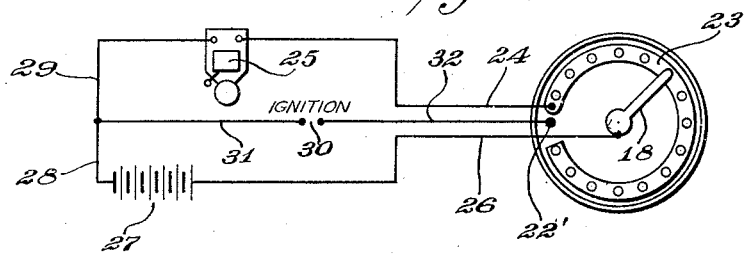
Figure 2 is a diagram showing the wiring forming certain features of the invention, the same illustrating how the lock is connected to a source of current to the ignition of the engine and an alarm device.

As indicated in Figure 5, the casing 9 is divided into compartments 11 and 12, said compartments being separated by a plate 13 having a ring 14 mounted thereon, which ring overlaps the annular insulating wall 15. On the ring 14 are arranged a number of legends 16 which are shown as numerals in the drawing though other designations may be used. Also, in the drawing, sixteen legends have been shown as there are sixteen corresponding parts but it will be evident that a greater or less number could be used without departing from the spirit of the invention. Associated with the wall 15 are a number of blocks 17 of insulating material, as for instance, fiber, which are secured in any desired manner to wall 15, as for instance, by adhesive or screws. These blocks are spaced apart a short distance so as to permit the contact blade 18 to pass therebetween whenever the hand wheel 10 has been lowered. Carried by each block is a pivotally mounted pawl or catch 19 normally supported in an almost horizontal position by a spring 20. Preferably, both the spring and the catch 19 are carried by a single screw 21 though separate mounts might be used. Below the various catches 19 are arranged resilient contacts 22 which are connected in any desired manner to the contact ring 23, as for instance, by having a tongue 24 pressed out of the metal and soldered to the ring. The ring 23 as indicated in Figure 2 is connected by wire 24 to one side of the signal device 25 which has been illustrated as an electric bell. The contact arm 18 is connected through a suitable conductor 26 to a source of current 27 which in turn is connected through wires 28 and 29 to one side of the bell 25. It will thus be seen that whenever the contact arm 18 is engaging any of the contacts 22, the bell 25 will be operated. The ignition system of the engine is indicated by the structure 30 in Figure 2 and it will be noted that the ignition is connected to a source of current through wires 31 and 28 and also through wires 32, arm 18 and wire 26. It will thus be noted that when the contact arm 18 is in engagement with any of the contacts 22, the ignition is cut out and, therefore, the engine cannot be started. When the arm 18 is pressed downwardly so as to engage any of the contacts 22, rod 7 will be moved and gear wheel 6 disengaged but the engine cannot be started by reason of the non-connection of the source of current with the ignition. However, there is provided one contact 22' which is similar to the various contacts 22 but is not connected with the ring 23. The wire 32 is connected to contact 22' and to the ignition so that whenever arm 18 is moved around and then pressed downwardly into engagement with the contact 22', the ignition circuit will be closed but the circuit of the bell 25 will remain open. It will thus be seen that when arm 18 is pressed downwardly to engage contact 22', gear wheel 6 is moved to a disengaged position, the ignition circuit is closed and the circuit of the bell is left open. As clearly indicated in Figure 5, contact arm 18 is in the chamber 11 which cannot be seen either by an authorized or unauthorized person.

Figure 3:
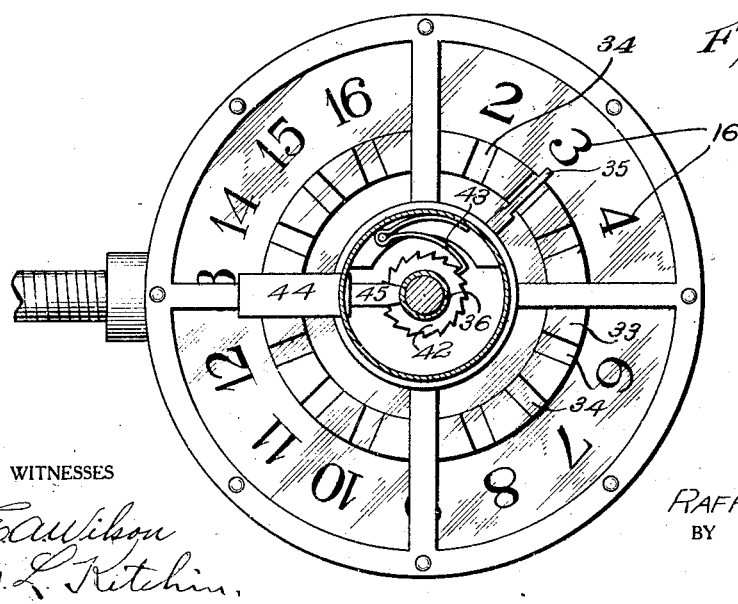
Figure 3 is a sectional view through the lock on line 3—3 of Figure 1, the same being on an enlarged scale.

In order that an authorized person may know just where arm 18 is located, indicating means have been provided in the compartment or chamber 12. Extending upwardly from the plate 13 and preferably integral therewith, are a number of posts 33 which result in a number of slots 34, there being one slot for each of the contacts 22 in the lower chamber and these slots are also in line with the contacts so that if the arm 18 and arm 35 are in vertical alignment, they will both enter slots at the same time one above the other. Preferably, however, the arms 35 and 18 are never in alignment but always bear certain relationship to each other. This relationship is capable of change or adjustment by means described below. If arm 18 is positioned to enter contact 22' (Figure 2) arm 35 may be positioned to enter the slot 34 indicated by the legend 2 in Figure 3. When this relationship of the arms is adopted, the rightful owner will merely manually lock the arms 35 and 18 together by the means later disclosed. When a change is desired the arm 35 can be adjusted until it indicates some other legend in Figure 3. The car is in this manner protected and the owner may leave the same with reasonable assurance of safety. A thief or unauthorized person would not know the correct position of either of the arms and would probably never guess that the correct position was the legend 2 in Figure 3. However, when the rightful owner returned, he would quickly turn arm 35 to a position opposite the legend 2 in Figure 3 and then depress the crank wheel 10. This would cause the arm 18 to firmly engage the resilient contact 22' and at the same time disengage gears 5 and 6. The engine may then be started in the usual manner and the automobile also steered in the usual manner. As to the means for locking the arms 18 and 35 in any selected relationship it will be noted that arm 35 is rigidly secured to sleeve 36 by a set screw though other means might be used while the arm 18 is secured to the rod 37 by solder or other suitable means. It will be noted that the rod 37 is formed with an annular flange or enlargement 38 at the lower end fitting into a socket formed in shaft 7 and held rotatable therein by a ring 39 riveted or otherwise secured in place. By reason of the square guide 8, shaft 7 and ring 9 cannot rotate. A ratchet wheel 40 is rigidly secured in any suitable manner to rod 37 so as to rotate therewith. A spring pressed pawl 41 (Figure 4) is mounted on the ring 39 and thereby prevents the rod 37 from rotating in one direction. A clockwise rotation of the rod 37 is permissible, both the hand wheel 10 and rod 37 being thus rotatable in the operation of the device. A ratchet wheel 42 is rigidly secured by solder or other means to the sleeve 36, said ratchet wheel facing in the opposite direction to ratchet wheel 40. The spring pressed pawl 43 (Figure 3) acts to prevent the ratchet wheel 42 and the sleeve 36 from rotating in one direction, counterclockwise rotation of the hand wheel 10 independently of the rod 37 being permissible when the hand wheel is unlocked for the purpose of changing the relationship of the arm 35 to the arm 18. A key operated lock 44 of any desired kind is carried by the wheel 40 in position so that the bolt 45 thereof may be projected into an opening 46 in sleeve 36 (this being the normal condition of the bolt) whereby when the bolt has been moved to its locked position the wheel 40 and sleeve 36 will be locked together and, consequently, the sleeve 36 will turn with rod 37 and both of the arms 18 and 35 will move simultaneously and in the same direction. The hand wheel 10 is secured by a set screw or other desired means to the rod 37 and is used to manipulate both the sleeve 36 and the rod 37 when the parts are locked together and to separately manipulate rod 37 when the lock 44 is moved to an unlocked position preparatory to an independent adjustment of the arm 35 as when changing the relationship of the arms. When this is the case a finger wheel 47 is used for rotating sleeve 36, said wheel 47 being secured in any desired manner to the sleeve 36.

In operation, when the parts are as shown in Figure 1, the lock is in a locked condition. If an unauthorized person should push the wheel 10 downwardly, the gear 6 would become disengaged from gear 5 but the ignition circuit would not be closed. On the contrary, the circuit of bell 25 would be closed and an alarm would be immediately given which would attract persons in the neighborhood and, consequently, cause the unauthorized person to leave the automobile. If a person familiar with the combination grasps wheel 10, he would turn the same to the correct position and then depress the parts as heretofore described whereupon engagement of the arm 18 with the contact 22' is effected and the ignition circuit would be closed. The gear wheel 6 is then moved out of engagement with gear wheel 5. In order to prevent an unauthorized person from closing the circuit of the bell and then opening the same, the catches 19 are formed with square ends 19' which strike against or engage the respective blocks 17 and, consequently, prevent the return of arm 18 to an upward position until casing 9 has been opened and the parts adjusted manually. The ratchet wheels 40 and 42 are each provided with the same number of teeth as there are legends 16 and openings 34 as well as the openings between the various blocks 17 so that the arms 18 and 35 will always stop opposite a slot whereby it may be forced downwardly if desired.

What I claim is:—

1. In combination with a steering rod having a locking member, a shaft having a complementary locking member, means preventing rotation of the shaft but permitting sliding movement, a revoluble and slidable rod in swivel connection with the shaft for sliding said shaft and moving the respective locking member into engagement and disengagement with the steering rod locking member, an alarm signal and a circuit therefor including a plurality of alarm circuit contacts, a contactor carried by the rod being engageable with any of the contacts, means associated with the rod furnishing an indication of the position of the contactor in respect to the contacts, and means associated with said contacts holding the contactor when engagement is made with any one of the contacts when said locking members are in the disengaging position.

2. In combination with a steering rod having a locking member, a shaft having a complementary locking member, means preventing rotation of the shaft but permitting sliding movement, a slidable and rotatable rod in swivel connection with the shaft for moving the respective locking member into engaging and disengaging positions with the steering rod locking member, an alarm signal and a circuit therefor including a plurality of alarm circuit contacts, a contactor carried by the rod being engageable with any of the contacts upon sliding movement of the rod whereupon the complementary locking member is moved to the indicating position, and means associated with all of the contacts excepting a predetermined one thereof for holding the contactor in engagement with an associated respective alarm circuit contact to maintain closure of the alarm circuit.

3. Means for locking and unlocking the steering gear of a motor vehicle said means including a shaft, means preventing rotation but permitting sliding motion of the shaft to effect the locking and unlocking functions, a rotatable and slidable rod in swivel connection with the shaft, an alarm signal and a circuit therefor, a plurality of contacts, including alarm circuit contacts, a contactor carried by the rod, means including a handwheel carried by the rod for rotating and sliding the rod, a visible indicator arm moving with the rod permitting a predetermined selection as to the position of the contactor in respect to the contacts during rotation of the hand wheel, slotted guide means into which the indicator arm is movable upon sliding of the rod when said contactor engages one of the contacts, and means associated with all of the contacts excepting a selected one thereof holding the contactor in engagement to maintain the closure of a circuit associated with such contacts and holding the indicator arm within said guide means to prevent further rotation of the rod.

4. Means for locking and unlocking the steering gear of a motor vehicle said means including a shaft, means preventing rotation but permitting sliding motion of the shaft to effect the locking and unlocking functions, a rotatable and slidable rod in swivel connection with the shaft, an alarm signal and a circuit therefor, a plurality of contacts including alarm circuit contacts, a contactor carried by the rod, means including a hand wheel carried by the rod for rotating and sliding the rod, a visible indicator arm moving with the rod permitting a predetermined selection as to the position of the contactor in respect to the contacts during rotation of the hand wheel, slotted guide means into which the indicator arm is movable upon sliding of the rod when said contactor engages one of the contacts, means associated with all of the contacts excepting a selected one thereof holding the contactor in engagement to maintain the closure of a circuit associated with said contacts and holding the indicator arm within said guide means to prevent further rotation of the rod, means associated with the indicator arm permitting a change thereof upon the rod and in relationship to the contactor.

5. In a device for operating inter-engaging locking members of a motor vehicle steering gear, a slidable and revoluble rod, an electric circuit, a plurality of contacts including contacts in said circuit, a contactor carried by the rod, indicating means for determining the position of the contactor in respect to said contacts, said means including an indicator arm and a dial with appropriate legends for each of the contacts, a sleeve by which the indicator arm is mounted upon the rod, and means for securing the sleeve upon the rod in effective position so that the indicator arm may have a predetermined relationship to the contactor.

6. In a device for operating inter-engaging locking members of a motor vehicle steering gear, a slidable and revoluble rod, an electric circuit, a plurality of contacts including contacts in said circuit, a contactor carried by the rod, indicating means for determining the position of the contactor in respect to said contacts said means including an indicator arm and a dial with appropriate legends for each of the contacts, a sleeve by which the indicator arm is mounted upon the rod, means for securing the sleeve upon the rod in effective position so that the indicator arm may have a predetermined relationship to the contactor, and means operable upon loosening of said securing means to vary the relative adjustment of the indicator arm and contactor.

7. In a device for operating inter-engaging locking members of a motor vehicle steering gear, a slidable and revoluble rod, an electric circuit, a plurality of contacts including contacts in said circuit, a contactor carried by the rod, indicating means for determining the position of the contactor in respect to said contacts, said means including an indicator arm and a dial with appropriate legends for each of the contacts, a sleeve by which the indicator arm is mounted upon the rod, means for securing the sleeve upon the rod in effective position so that the indicator arm may have a predetermined relationship to the contactor, means operable upon loosening of said securing means to vary the relative adjustment of the indicator arm and contactor, a hand wheel upon the rod by which the necessary rotatable and sliding movements are effected, means including a ratchet and pawl permitting rotation of the rod in one direction, and means including a pawl and ratchet associated with the hand wheel and sleeve permitting only a contrary rotation of the hand wheel and sleeve independently of the rod when said steering means is loosened, thereby changing the relationship of the indicator arm to the contactor.

8. In a device for operating inter-engaging locking members of a motor vehicle steering gear, a slidable and revoluble rod, an electric circuit, a plurality of contacts including contacts in said circuit, a contactor carried by the rod, indicating means for determining the position of the contactor in respect to said contacts, said means including an indicator arm and a dial with appropriate legends for each of the contacts, a sleeve by which the indicator arm is mounted upon a rod, means for securing the sleeve upon the rod in effective position so that the indicator arm may have a predetermined relationship to the contactor, means operable upon loosening of said securing means to vary the relative adjustment of the indicator arm and contactor, a hand wheel upon the rod by which the necessary rotatable and sliding movements are effected, means including a ratchet and pawl permitting rotation of the rod in one direction, means including a pawl and ratchet associated with the hand wheel and sleeve permitting only a contrary rotation of the hand wheel and sleeve independently of the rod when said steering means is loosened, thereby changing the relationship of the indicator arm to the contactor, and means including a lock carried by the hand wheel permitting release of the hand wheel in respect to the sleeve so that relative adjustments of the hand wheel in respect to the sleeve may be made.

RAFFAELE ALFISI.